Dec. 10, 1968  E. A. WHALEN  3,415,004
LIVE BAIT HARNESSES
Filed May 16, 1966  2 Sheets-Sheet 1
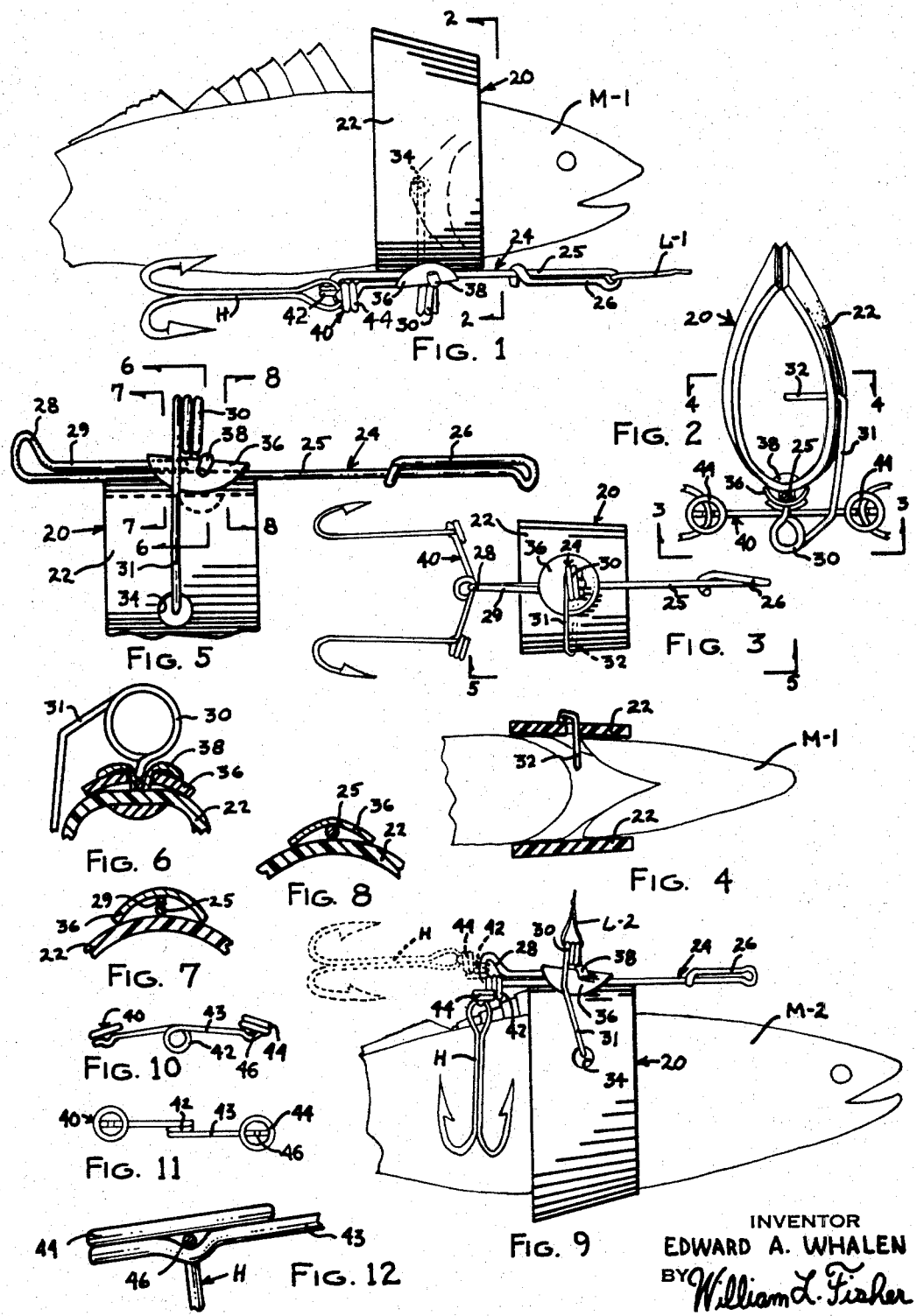
INVENTOR
EDWARD A. WHALEN
BY William L. Fisher
HIS ATTORNEY Dec. 10, 1968 E. A. WHALEN 3,415,004
LIVE BAIT HARNESSES Filed May 16, 1966 2 Sheets-Sheet 2

INVENTOR
EDWARD A. WHALEN
BY William L. Fisher
HIS ATTORNEY 3,415,004
LIVE BAIT HARNESSES
Edward A. Whalen, 29251 Grandview,
Mount Clemens, Mich. 48043
Filed May 16, 1966, Ser. No. 550,522
7 Claims. (Cl. 43—42.74)

ABSTRACT OF THE DISCLOSURE

The improvement in a live bait harness having a band embracing the body of the live bait comprising two one-piece wire mechanisms one of which is fast to the band and the other of which is a spreader mechanism for holding a pair of fishhooks spaced apart on opposite sides of the live bait. The one mechanism forms a coil and a substantially right triangular loop, each upstanding in respect to said band. The spreader mechanism has a plural turn coil and is held on the one mechanism by said loop and the plural turn coil. Movement between the two mechanisms is restricted by the axial length of the plural turn coil and the size of the substantially right triangular loop. At both ends of the spreader mechanism the spreader arms are crimped and are then formed into coils for snap-holding fishhooks between the crimp and the end coils.

My invention relates to improvements in live bait harnesses.

The principal object of my invention is to improve upon and overcome the deficiencies of the live bait harness shown in my prior U.S. Patent 3,105,319.

The foregoing object of my invention and its advantages will become apparent during the course of the following description, taken in conjunction with the accompanying drawings, in which:

FIGS. 1 and 9 are side elevational views of a live bait harness embodying my invention shown with a minnow captured in different positions therein for different types of fishing;

FIGS. 2, 3 and 5 are, respectively, front elevational, bottom plan, and fragmentary side elevational views of said embodiment of live bait harness;

Figure 14:
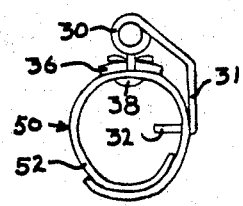
Figure 13:
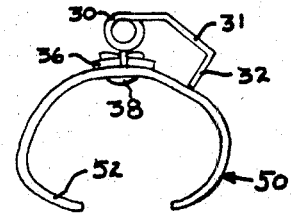
Figure 15:
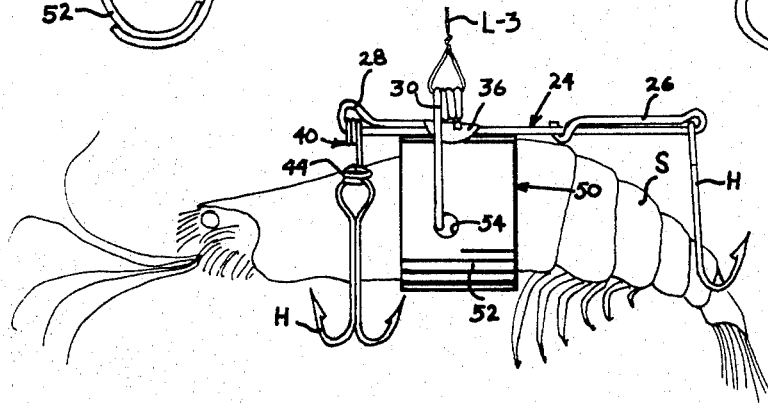
Figure 16:
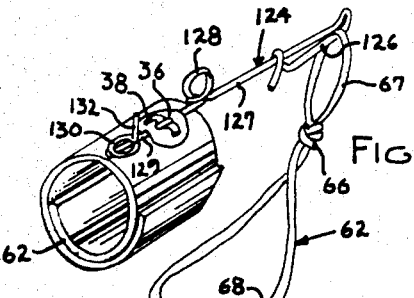
Figure 17:
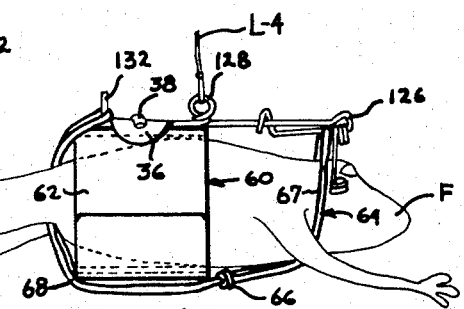
Figure 18:
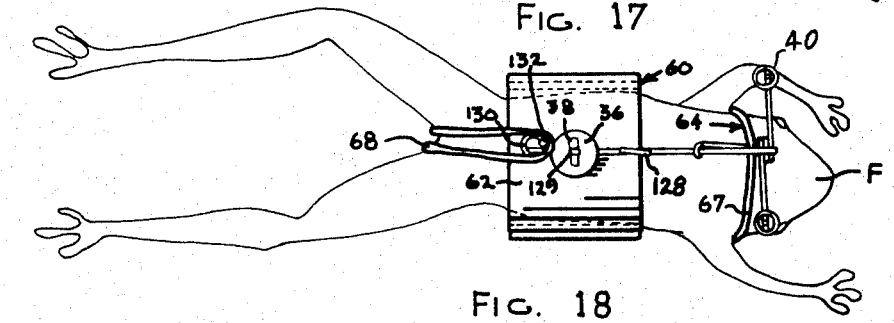

FIGS. 4, 6, 7 and 8 are transverse and vertical sectional views of said embodiment as shown by the line 4—4 in FIG. 2 and by the lines 6—6, 7—7 and 8—8 in FIG. 5;

FIGS. 10, 11 and 12 are front elevational, top plan, and fragmentary elevational views of a spreader mechanism used with said live bait harness;

FIGS. 13, 14 and 15 are front and side elevational views of another live bait harness embodying my invention; and FIGS. 16, 17 and 18 are perspective, side elevational and top plan views of a still further live bait harness embodying my invention.

Referring to the drawings in greater detail, the live bait harness shown in FIGS. 1–9 is designated 20 and comprises a holding band 22 preferably of split construction as shown and formed of plastic for holding live bait such as the minnow M–1 shown in FIG. 1 or the minnow M–2 shown in FIG. 9 by embracing the body thereof and a one piece wire holding mechanism 24 for holding such minnows by penetrating the same. The mechanism 24 which also serves as a hook and fish line attaching means comprises a straight run 25 of wire terminating at one end in a wire clasp 26 and in a closed loop 28 of right triangular shape at the other end. Another straight but shorter run 29 of wire extends from the loop 28 to a vertical coil 30 of several full turns of wire. A bent run 31 of wire extends from the coil 30 and terminates in a prong 32 at an acute angle to the run 31. The prong 32 normally projects through an aperture 34 in the band 22 and this position is also its capture position in which it holds live bait from moving longitudinally relative to the band 22. In casting or trolling the band 22 is placed around the minnow at its gills and the prong 32 is made to project into the gill of the minnow as shown in FIGS. 1 and 4. A fish line is attached to the clasp 26 as shown for the line L–1 in FIG. 1. The band is tapered forwardly and inwardly as shown in FIGS. 2 and 4 to provide for lateral expansion of the minnow's gills as the minnow breathes while captured in the live bait harness 20. In still or ice fishing a fish line is attached to the coil 30 as shown for the line L–2 in FIG. 9 and the band 22 is placed at the balance point of the minnow's body. The prong 32 is made to puncture the meaty part of the minnow's back just under the dorsal fine. In each instance both the minnows M–1 and M–2 are threaded through the body band 22 in an upside down position and penetrated with the prong 32. During threading of a minnow through the body band 22 the prong 32 is placed in a retracted position with its free end held against the outer wall of the band 22 adjacent the aperture 34. Thereafter the prong 32 is inserted through the aperture 34 to penetrate the minnow. The mechanism 24 is fastened to the band 22 by a washer 36 which, at one end thereof, lays over the straight run 25 only and at the other end thereof lays over both the straight runs 25 and 29. The vertical wire by which the coil 30 upstands threads through the central aperture of the washer 36 between the spread prongs of a pronged rivet 38, the head of which engages the inside top wall of the band 22 at the center thereof as shown. The coil 30 stands strong on the vertical wire and is substantially immobile in respect to the band 22. The portion of the run 25 beneath the washer 36 extends over the rivet 38 between the spread prongs thereof.

The loop 28 carries a spreader mechanism 40 which has a center coil 42 of two full turns and a pair of terminal coils 44 of single turns which are held spread apart from the center coil 42 by a pair of arms 43. A portion of each arm 43 transverses the respective coil 44 it carries beneath the same and is provided with a crimp 46 into which the loop wire of a hook H snaps (as shown in FIG. 12) as such hook wire is inserted beneath the coil 44 by sliding it over the arm 43 away from the center coil 42. The spreader mechanism 40 carries a pair of hooks H spaced apart beyond each side of a minnow. In casting or trolling the pair of hooks H are supported longitudinally of the minnow beneath it in the position shown in FIG. 1 by such mechanism 40 and by the water in which the minnow M–1 is pulled via the holding mechanism 24 by the line L–1. In biting the minnow M–1, fish cannot avoid the hooks H particularly because such hooks cannot swing counter-clockwise as viewed in FIG. 1 due to the action of the sides forming the right angle of the right triangular loop 28 and the axial length of the coil 42. In still or ice fishing the pair of hooks H are carried by the mechanism 40 in a suspended position above the minnow on each side thereof and are capable of 90 degrees clockwise rotation as viewed in FIG. 9 and shown for the minnow M–2 therein.

The live bait harness shown in FIGS. 13–15 is designated 50 and comprises a holding band 52 of wrap-around construction and preferably formed of plastic for holding live bait such as shrimp S shown in FIG. 15. The same one-piece wire holding mechanism 24 is affixed to the band 52 as before described. The band 52 can be opened substantially as shown in FIG. 13 which also shows the prong 32 in its retracted position held against the outside wall of the band. In this position the live bait harness 50 is affixed to the relatively leg-free midsection of the shrimp S by turning the latter upside down and inserting it into the opened band 52. The latter is allowed to wrap itself about the body of the shrimp S and the prong 32 is then made to puncture its midsection. The spreader mechanism 40 pivotally hangs a pair of hooks H from above the shrimp S on each side and at the front thereof. Another hook H is hung from the clasp 26 at the rear end of the shrimp S which is the leading end in the water since the shrimp S swims backwards. A fish line is affixed to the coil 30 as shown for the fish line L-3 in FIG. 15.

The live bait harness shown in FIGS. 16–18 is designated 60 and comprises a holding band for holding live bait such as a frog F shown in FIGS. 17 and 18. The band 62 has no aperture for a prong since a frog has feeling and, unlike a minnow or shrimp, cannot be punctured without adversely affecting its health. A one-piece wire holding mechanism 124 is provided for holding the frog F in a resilient sling without harming it. The mechanism 124 which also serves as a took and fish line attaching means and comprises straight runs 127 and 129 of wire joined by an in-line loop 128. The run 127 terminates in a clasp 126 and the run 129 in a vertically projecting anchor 132 which is joined to the run 129 by a horizontal coil 130 of at least one full run. The mechanism 124 is fastened to the band 62 by the washer 36 which lays over the run 129. The latter in turn extends over the rivet 38 between the spread prongs thereof. The spreader mechanism 40 is carried via its center coil 42 in the clasp 126 in this instance and in the same clasp is carried the smaller loop 67 of a rubber band 64 which has a larger loop 68 joined to the loop 67 by a knot 66. The fish line is affixed to the vertical coil 128 as shown for the line L-4 in FIG. 17. The band 62 is opened and the frog F captured therein by placing the band 62 down upon the frog's back and allowing the free ends thereof to wrap themselves around the frog's waist while the frog F is maintained in an upright position. The head of the frog F is then inserted in the lop 66 and the loop 68 is drawn rearwardly and upwardly between the frog's legs and its looped end placed over the anchor 132. The stretch of the rubber band is then adjusted so that it is distributed somewhat evenly over the frog's length. The spreader mechanism 40 pivotally suspends a pair of hooks on opposite sides of the frog F behind its head.

It will thus be seen that there has been provided by the present invention improvements in live bait harnesses in which the object hereinabove set forth, together with many other thoroughly practical advantages, has been successfully achieved.

What is claimed is:

1. In a live bait harness having a band embracing the body of the live bait, the improvement comprising two one-piece wire holding mechanisms, one said mechanism fast to said band and the other being a spreader mechanism having means for holding a pair of fish hooks spaced apart on opposite sides of the live bait, said spreader mechanism also having a plural turn coil for attachment to said one mechanism, said one mechanism forming a coil and a loop, each upstanding with respect to said band, said spreader mechanism held on said one mechanism by said loop, said loop being substantially right triangular in profile, the sides of which forming the right angle thereof are so constructed with respect to the axial length of said plural turn coil of said spreader mechanism so as to restrict movement of said spreader mechanism to substantially 90 degree pivotal movement with respect to said one mechanism.

2. In a live bait harness as claimed in claim 1, said one mechanism coil having multiple turns and having its axis parallel to the axis of the band.

3. In a live bait harness as claimed in claim 2, said one mechanism also having a prong, and a run of wire integrally interconnecting a turn of said one mechanism coil and said prong, said band having an aperture in the side thereof, said prong resiliently urged by the one mechanism coil to project through said aperture in the side of the band.

4. In a live bait harness as claimed in claim 2, said one mechanism including a clasp extending longitudinally from the band oppositely of the substantially right triangular loop.

5. In a live bait harness as claimed in claim 1, said spreader mechanism having a pair of arms proceeding from said plural turn coil, and a coil resting on the end of each arm for holding the eye of a fish hook, the portion of each arm beneath the respective coil thereon disposed on a diameter of said coil and having a crimp therein to restrict movement of said fish hook to substantially 90 degree pivotal movement with respect to said spreader mechanism.

6. In a live bait harness as claimed in claim 1, a stretchable member and an upstanding run of wire of said one mechanism serving as an anchor for an end of the stretchable member while the latter is stretched over the live bait.

7. In a live bait harness as claimed in claim 6, a knot in the stretchable member forming loops therein for wrapping about a part of the body of the live bait, one of said loops engageable with said anchor.

References Cited

UNITED STATES PATENTS

| | | | |
|---|---|---|---|
| 1,227,325 | 5/1917 | Schilling | 43—42.74 |
| 2,402,730 | 6/1946 | Bucks | 43—44.4 |
| 2,407,759 | 9/1946 | McDougal | 43—44.4 |
| 2,605,579 | 8/1952 | Chadwick | 43—44.4 |
| 2,700,242 | 1/1955 | Porth | 43—44.4 |
| 2,927,393 | 3/1960 | Flamisch et al. | 43—44.2 |
| 3,105,319 | 10/1963 | Whalen | 43—44.4 |
| 3,284,945 | 11/1966 | Kurtis | 43—44.2 |
| 2,459,401 | 1/1949 | Wiitala | 43—42.44 |

FOREIGN PATENTS 51,227  3/1922  Sweden.

SAMUEL KOREN, *Primary Examiner.*

J. H. CZERWONKY, *Assistant Examiner.*

U.S. Cl. X.R.

43—42.44, 44.4, 44.6